United States Patent
Seregin et al.

(10) Patent No.: US 8,849,022 B2
(45) Date of Patent: Sep. 30, 2014

(54) METHODS AND APPARATUSES FOR ENCODING AND DECODING IMAGE BASED ON SEGMENTS

(71) Applicant: Samsung Electronics Co., Ltd., Suwon-si (KR)

(72) Inventors: Vadim Seregin, Suwon-si (KR); Jianle Chen, Suwon-si (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/925,408

(22) Filed: Jun. 24, 2013

(65) Prior Publication Data

US 2013/0279574 A1 Oct. 24, 2013

Related U.S. Application Data

(63) Continuation of application No. 13/080,076, filed on Apr. 5, 2011, now Pat. No. 8,472,710.

(30) Foreign Application Priority Data

Apr. 5, 2010 (KR) ........................ 10-2010-0031144

(51) Int. Cl.
*G06K 9/36* (2006.01)
*H04N 19/44* (2014.01)
*H04N 19/176* (2014.01)
*H04N 19/593* (2014.01)
*H04N 19/61* (2014.01)
*H04N 19/119* (2014.01)
*H04N 19/186* (2014.01)

(52) U.S. Cl.
CPC ... *H04N 19/00533* (2013.01); *H04N 19/00278* (2013.01); *H04N 19/00763* (2013.01); *H04N 19/00781* (2013.01); *H04N 19/00072* (2013.01); *H04N 19/00315* (2013.01)
USPC ............................................ 382/166; 382/233

(58) Field of Classification Search
USPC .......... 382/165, 166, 171, 173, 232, 238–240
See application file for complete search history.

(56) References Cited

U.S. PATENT DOCUMENTS

| | | |
|---|---|---|
| 2005/0013370 A1 | 1/2005 | Kim et al. |
| 2007/0014478 A1 | 1/2007 | Birinov et al. |
| 2008/0304759 A1 | 12/2008 | Lee et al. |

FOREIGN PATENT DOCUMENTS

| | | |
|---|---|---|
| EP | 2086239 A2 | 8/2009 |
| WO | 2010/036772 A2 | 4/2010 |

OTHER PUBLICATIONS

Richardson; "H.264/MPEG-4 Part 10 White Paper—Prediction of Intra Macroblocks", Published Apr. 30, 2003, Retrieved from the Internet: URL: http://www.vcodex.com/h264.html/h264_intrapred.pdf, pp. 1-6.

Extended Search Report dated Jul. 8, 2013, issued by the European Patent Office in counterpart European Application No. 11766125.6.

International Search Report (PCT/ISA/210) and Written Opinion (PCT/ISA/237) dated Dec. 7, 2011, issued in counterpart International Application No. PCT/KR2011/002374.

*Primary Examiner* — Duy M Dang
(74) *Attorney, Agent, or Firm* — Sughrue Mion, PLLC

(57) ABSTRACT

Encoding and decoding an image may be performed by setting a plurality of segments of a second color component block based on pixel values of a first color component block. The plurality of segments may be predicted by using different context pixels, and the second color component block may be encoded and decoded based on the predicted plurality of segments.

3 Claims, 15 Drawing Sheets

CODING UNIT

PREDICTION UNIT

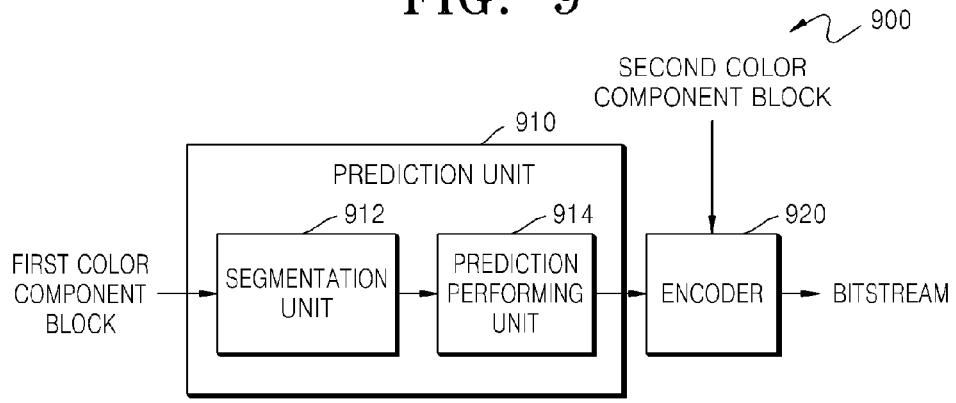

FIG. 14A

| $N_5$ | $N_6$ | $N_7$ | $N_8$ | $N_9$ | $N_{10}$ |
|---|---|---|---|---|---|
| $N_4$ | Seg0 | Seg0 | Seg1 | Seg1 | |
| $N_3$ | Seg0 | Seg0 | Seg1 | Seg1 | |
| $N_2$ | Seg0 | Seg0 | Seg1 | Seg1 | —1020 |
| $N_1$ | Seg0 | Seg1 | Seg1 | Seg1 | |
| $N_0$ | | | | | |

FIG. 14B

| $N_3$ | $N_4$ | $N_6$ | $N_7$ |
|---|---|---|---|
| $N_2$ | Seg0 | Seg1 | |
| $N_1$ | Seg0 | Seg1 | —1310 |
| $N_0$ | | | |

METHODS AND APPARATUSES FOR ENCODING AND DECODING IMAGE BASED ON SEGMENTS

CROSS-REFERENCE TO RELATED PATENT APPLICATION

This application is a Continuation Application of U.S. application Ser. No. 13/080,076 filed Apr. 5, 2011, now Patent No. 8,472,710, which claims priority from Korean Patent Application No. 10-2010-0031144, filed on Apr. 5, 2010, in the Korean Intellectual Property Office, the disclosure of which is incorporated herein by reference in its entirety.

BACKGROUND

1. Field

One or more aspects of the exemplary embodiments relate to methods and apparatuses for prediction encoding and decoding an image, and more particularly, to methods and apparatuses for prediction encoding and decoding an image as a plurality of color components.

2. Description of the Related Art

In an image encoding method, such as Moving Picture Experts Group (MPEG)-1, MPEG-2, MPEG-4 H.264/MPEG-4 Advanced Video Coding (AVC), an image is divided into blocks having predetermined sizes to encode the image, and then each block is prediction encoded by using inter prediction or intra prediction.

A residual block is generated by subtracting a prediction block generated as a inter-prediction or intra-prediction result, and a bitstream is generated by performing discrete cosine transform (DCT) on the generated residual block, and quantizing and entropy-encoding the generated residual block.

In addition, in a conventional image encoding method, an image is encoded by using a plurality of color components. A single pixel is realized as a luminance component and a chroma component, and the luminance component and the chroma component are encoded. The chroma component may include a blue chroma component (Cb) and a red chroma component (Cr).

SUMMARY

One or more aspects of the exemplary embodiments provide methods and apparatuses for prediction encoding and decoding an image as a plurality of color components, and computer readable recording media storing a computer readable program for executing the methods.

According to an exemplary embodiment, a method of encoding an image may include segmenting a second color component block of a current block into a plurality of segments based on pixel values of a first color component block of the current block; predicting a first segment among the plurality of segments based on a first pixel value of a second color component pixel that is adjacent to the first segment and included in a region encoded prior to the current block and predicting a second segment among the plurality of segments based on a second pixel value of a second color component pixel that is adjacent to the second segment and included in the region encoded prior to the current block; and encoding the second color component block based on the predicted first segment and the predicted second segment.

The segmenting may include setting a predetermined reference value based on pixel values of the first color component block; and setting the plurality of segments of the second color component block based on a first portion and a second portion, wherein, from among pixels of the first color component block, a pixel having a pixel value that is equal to or smaller than the reference value is set as the first portion, and a pixel having a pixel value that is greater than the reference value is set as the second portion.

The setting of the predetermined reference value may include determining a 4N×4M size block regarding a first color component, which includes the first color component block having a size of 2N×2M; down-sampling the 4N×4M size block and generating a down-sampled 2N×2M size block based on the down-sampled 4N×4M size block; and setting a mean of pixel values of the down-sampled 2N×2M size block as a reference value.

The determining of the 4N×4M size block regarding the first color component may include padding at least one part of the 4N×4M size block based on pixel values of pixels adjacent to a boundary of the first color component block.

The setting of the plurality of segments of the second color component block based on the first portion and the second portion may include setting, from among pixels included in the down-sampled 2N×2M size block, a pixel having a pixel value that is equal to or smaller than the reference value as the first portion, and setting a pixel having a pixel value that is greater than the reference value as the second portion; and setting the plurality of segments of the second color component block based on the first portion and the second portion of the down-sampled 2N×2M size block.

The setting of the plurality of segments of the second color component block based on the first portion and the second portion of the down-sampled block may include setting the plurality of segments of the second color component block to be the same as the first portion and the second portion of a N×M size block positioned in a central portion of the down-sampled block having a size of 2N×2M.

The predicting may include predicting the first segment and the second segment based on a mean of a plurality of pixel values of the second color component included in regions that are encoded prior to the current block and adjacent to the first segment and the second segment of the second color component block of the current block.

According to an exemplary embodiment, a method of decoding an image may include segmenting a second color component block of a current block into a plurality of segments based on pixel values of a first color component block of the current block; predicting a first segment among the plurality of segments based on a first pixel value of a second color component pixel that is adjacent to the first segment and included in a region decoded prior to the current block and predicting a second segment among the plurality of segments based on a second pixel value of a second color component pixel that is adjacent to the second segment and included in the region decoded prior to the current block; and decoding the second color component block based on the predicted first segment and the predicted second segment.

According to an exemplary embodiment, an apparatus for encoding an image may include a prediction unit that segments a second color component block of a current block into a plurality of segments based on pixel values of a first color component block of the current block, predicts a first segment among the plurality of segments based on a first pixel value a the second color component pixel that is adjacent to the first segment and included in a region encoded prior to the current block, and predicts a second segment among the plurality of segments based on a second pixel value of a second color component pixel that is adjacent to the second segment and included in the region encoded prior to the current block; and an encoder that encodes the second color component block based on the predicted first segment and the predicted second segment.

According to an exemplary embodiment, an apparatus for decoding an image may include a prediction unit that segments a second color component block of a current block into a plurality of segments based on pixel values of a first color component block of the current block, predicts a first segment among the plurality of segments based on a first pixel value of a second color component pixel that is adjacent to the first segment and included in a region decoded prior to the current block, and predicts a second segment among the plurality of segments based on a second pixel value of a second color component pixel that is adjacent to the second segment and included in the region decoded prior to the current block; and a decoder that decodes the second color component block based on the predicted first segment and the predicted second segment.

According to exemplary embodiments, a computer readable recording medium may store a computer readable program for executing the method of encoding an image, and a computer readable recording medium may store a computer readable program for executing the method of decoding an image.

BRIEF DESCRIPTION OF THE DRAWINGS

The above and other features and advantages will become more apparent by describing in detail exemplary embodiments thereof with reference to the attached drawings in which:

FIG. 9 is a block diagram of an apparatus for encoding an image, according to an exemplary embodiment;

FIGS. 10A and 10B are diagrams of pixel values of a first color component block, and segmentation of a second color component block based on pixel values of the first color component block, respectively, according to an exemplary embodiment;

FIGS. 14A and 14B are diagrams for explaining a method of predicting a second color component block, according to an exemplary embodiment;

DETAILED DESCRIPTION

Figure 1:
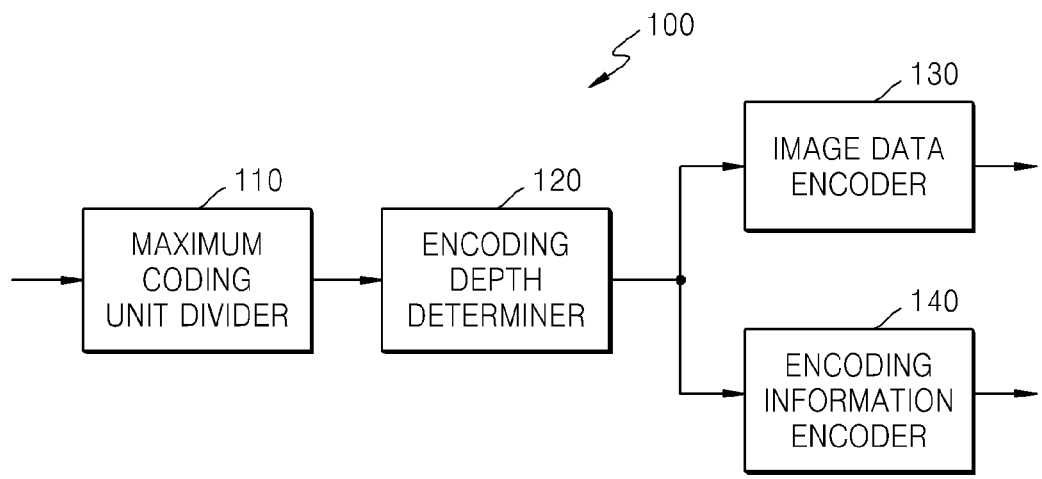
FIG. 1 is a block diagram of an apparatus for encoding an image, according to an exemplary embodiment.

Certain exemplary embodiments are described in greater detail below with reference to the accompanying drawings. Expressions such as "at least one of," when preceding a list of elements, modify the entire list of elements and do not modify the individual elements of the list. In the present specification, an "image" may denote a still image for a video or a moving image, that is, the video itself.

In the following description, like drawing reference numerals are used for the like elements, even in different drawings. The matters defined in the description, such as detailed construction and elements, are provided to assist in a comprehensive understanding of the exemplary embodiments. However, exemplary embodiments can be practiced without those specifically defined matters.

FIG. 1 is a block diagram of an image encoding apparatus 100 for encoding an image, according to an exemplary embodiment. The image encoding apparatus 100 may be implemented as a hardware apparatus such as, for example, a processor of a computer or a computer system. The image encoding apparatus 100 may be also implemented as a software module residing on the computer system.

Referring to FIG. 1, the image encoding apparatus 100 includes a maximum coding unit divider 110, an encoding depth determiner 120, an image data encoder 130, and an encoding information encoder 140. The maximum coding unit divider 110, encoding depth determiner 120, image data encoder 130, and encoding information encoder 140 may be implemented, for example, as hardware or software modules integrated within the image encoding apparatus 100 or separately from the image encoding apparatus 100.

The maximum coding unit divider 110 may divide a current frame or slice based on a maximum coding unit that is a coding unit of the largest size. That is, the maximum coding unit divider 110 may divide the current frame or slice into at least one maximum coding unit.

According to an exemplary embodiment, a coding unit may be represented using a maximum coding unit and a depth. As described above, the maximum coding unit indicates a coding unit having the largest size from among coding units of the current frame, and the depth indicates a degree of hierarchically decreasing the coding unit. As a depth increases, a coding unit may decrease from a maximum coding unit to a minimum coding unit, wherein a depth of the maximum coding unit is defined as a minimum depth and a depth of the minimum coding unit is defined as a maximum depth. Since the size of a coding unit decreases from a maximum coding unit as a depth increases, a sub coding unit of a kth depth may include a plurality of sub coding units of a (k+n)th depth (k and n are integers equal to or greater than 1).

According to an increase of the size of a frame to be encoded, encoding an image in a greater coding unit may cause a higher image compression ratio. However, if a greater coding unit is fixed, an image may not be efficiently encoded by reflecting continuously changing image characteristics.

For example, when a smooth area such as the sea or sky, is encoded, the greater a coding unit the more a compression ratio may increase. However, when a complex area such as people or buildings, is encoded, the smaller a coding unit the more a compression ratio may increase.

Accordingly, in an exemplary embodiment, a maximum image coding unit and a maximum depth are set for each frame or slice. Since a maximum depth denotes the maximum number of times by which a coding unit may decrease, the size of each minimum coding unit included in a maximum image coding unit may be variably set according to a maximum depth. The maximum depth may be determined differently for each frame or slice or for each maximum coding unit.

The encoding depth determiner 120 determines a division shape of the maximum coding unit. The division shape may be determined based on calculation of rate-distortion (RD) costs. The determined division shape of the maximum coding unit is provided to the encoding information encoder 140, and image data according to maximum coding units is provided to the image data encoder 130.

A maximum coding unit may be divided into sub coding units having different sizes according to different depths. The sub coding units having different sizes, which are included in the maximum coding unit, may be predicted or frequency-transformed based on processing units having different sizes. In other words, the image encoding apparatus 100 may perform a plurality of processing operations for image encoding based on processing units having various sizes and various shapes. To encode image data, processing operations, such as prediction, transform, and entropy encoding, are performed, wherein processing units having the same size or different sizes may be used for every operation.

For example, the image encoding apparatus 100 may select a processing unit that is different from a coding unit to predict the coding unit.

When the size of a coding unit is 2N×2N (where N is a positive integer), processing units for prediction may be 2N×2N, 2N×N, N×2N, and N×N. In other words, motion prediction may be performed based on a processing unit having a shape whereby at least one of a height and a width of a coding unit is equally divided by two. Hereinafter, a processing unit, which is the base of prediction, is defined as a prediction unit.

A prediction mode may be at least one of an intra mode, an inter mode, and a skip mode, and a specific prediction mode may be performed for only a prediction unit having a specific size or a specific shape. For example, the intra mode may be performed for only prediction units having the sizes of 2N×2N and N×N which have the shape of a square. Further, the skip mode may be performed for only a prediction unit having the size of 2N×2N. If a plurality of prediction units exists in a coding unit, the prediction mode with the fewest encoding errors may be selected after performing prediction for every prediction unit.

Alternatively, the image encoding apparatus 100 may perform frequency transform on image data based on a processing unit having a size different from a size of a coding unit. For the frequency transform in the coding unit, the frequency transform may be performed based on a processing unit having a size equal to or smaller than that of the coding unit. Hereinafter, a processing unit, which is the base of frequency transform, is defined as a transform unit. The frequency transform may be discrete cosine transform (DCT) or Karhunen Loeve transform (KLT).

The encoding depth determiner 120 may determine sub coding units included in a maximum coding unit using RD optimization based on a Lagrangian multiplier. In other words, the encoding depth determiner 120 may determine shapes of a plurality of sub coding units divided from the maximum coding unit, wherein the sub coding units have sizes according to the depths of sub coding units. The image data encoder 130 outputs a bitstream by encoding the maximum coding unit based on the division shapes determined by the encoding depth determiner 120.

The encoding information encoder 140 encodes information about an encoding mode of the maximum coding unit determined by the encoding depth determiner 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit may include information about a prediction unit of the sub coding unit, information about a prediction mode for each prediction unit, and information about a transform unit of the sub coding unit.

The information about the division shape of the maximum coding unit may be flag information, indicating whether each coding unit is divided. For example, when the maximum coding unit is divided and encoded, information indicating whether the maximum coding unit is divided is encoded. Also, when a sub coding unit divided from the maximum coding unit is divided and encoded, information indicating whether the sub coding unit is divided is encoded.

Since sub coding units having different sizes exist for each maximum coding unit and information about an encoding mode is determined for each sub coding unit, information about at least one encoding mode may be determined for one maximum coding unit.

The image encoding apparatus 100 may generate sub coding units by equally dividing the height and width of a maximum coding unit by two according to an increase of depth. That is, when the size of a coding unit of a kth depth is 2N×2N, the size of a coding unit of a (k+1)th depth is N×N.

Accordingly, the image encoding apparatus 100 may determine an optimal division shape for each maximum coding unit based on sizes of maximum coding units and a maximum depth in consideration of image characteristics. By variably adjusting the size of a maximum coding unit in consideration of image characteristics and encoding an image through division of a maximum coding unit into sub coding units of different depths, images having various resolutions may be more efficiently encoded.

Figure 2:
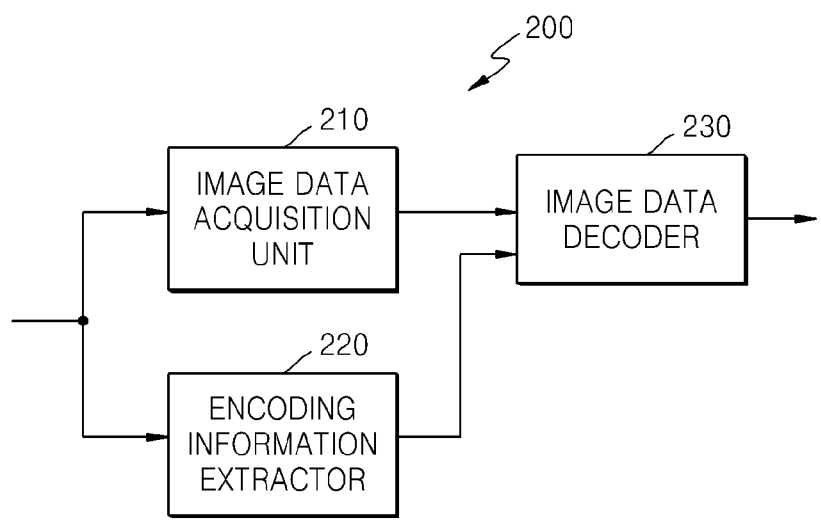
FIG. 2 is a block diagram of an apparatus for decoding an image, according to an exemplary embodiment.

FIG. 2 is a block diagram of an image decoding apparatus 200 for decoding an image according to an exemplary embodiment. The image decoding apparatus 200 may be implemented as a hardware apparatus such as, for example, a processor of a computer, or a computer system. The image decoding apparatus 200 may be also implemented as a software module residing on the computer system.

Referring to FIG. 2, the image decoding apparatus 200 includes an image data acquisition unit 210, an encoding information extractor 220, and an image data decoder 230. The image data acquisition unit 210, encoding information extractor 220, and image data decoder 230 may be implemented, for example, as hardware or software modules integrated within the image decoding apparatus 200 or separately from the image encoding apparatus 200.

The image data acquisition unit 210 acquires image data according to maximum coding units by parsing a bitstream received by the image decoding apparatus 200 and outputs the image data to the image data decoder 230. The image data acquisition unit 210 may extract information about a maximum coding unit of a current frame or slice from a header of the current frame or slice. In other words, the image data acquisition unit 210 divides the bitstream in the maximum coding unit so that the image data decoder 230 may decode the image data according to maximum coding units.

The encoding information extractor 220 extracts information about a maximum coding unit, a maximum depth, a division shape of the maximum coding unit, an encoding mode of sub coding units from the header of the current frame by parsing the bitstream received by the image decoding apparatus 200. The information about a division shape and the information about an encoding mode are provided to the image data decoder 230.

The information about a division shape of the maximum coding unit may include information about sub coding units having different sizes according to depths and included in the maximum coding unit, and may be flag information indicating whether each coding unit is divided.

The information about an encoding mode may include information about a prediction unit according to sub coding units, information about a prediction mode, and information about a transform unit.

The image data decoder 230 restores the current frame by decoding image data of every maximum coding unit based on the information extracted by the encoding information extractor 220.

The image data decoder 230 may decode sub coding units included in a maximum coding unit based on the information about a division shape of the maximum coding unit. A decoding process may include a prediction process including intra prediction and motion compensation and an inverse transform process.

The image data decoder 230 may perform intra prediction or inter prediction based on information about a prediction unit and information about a prediction mode to predict a prediction unit. The image data decoder 230 may also perform inverse transform for each sub coding unit based on information about a transform unit of a sub coding unit.

Figure 3:
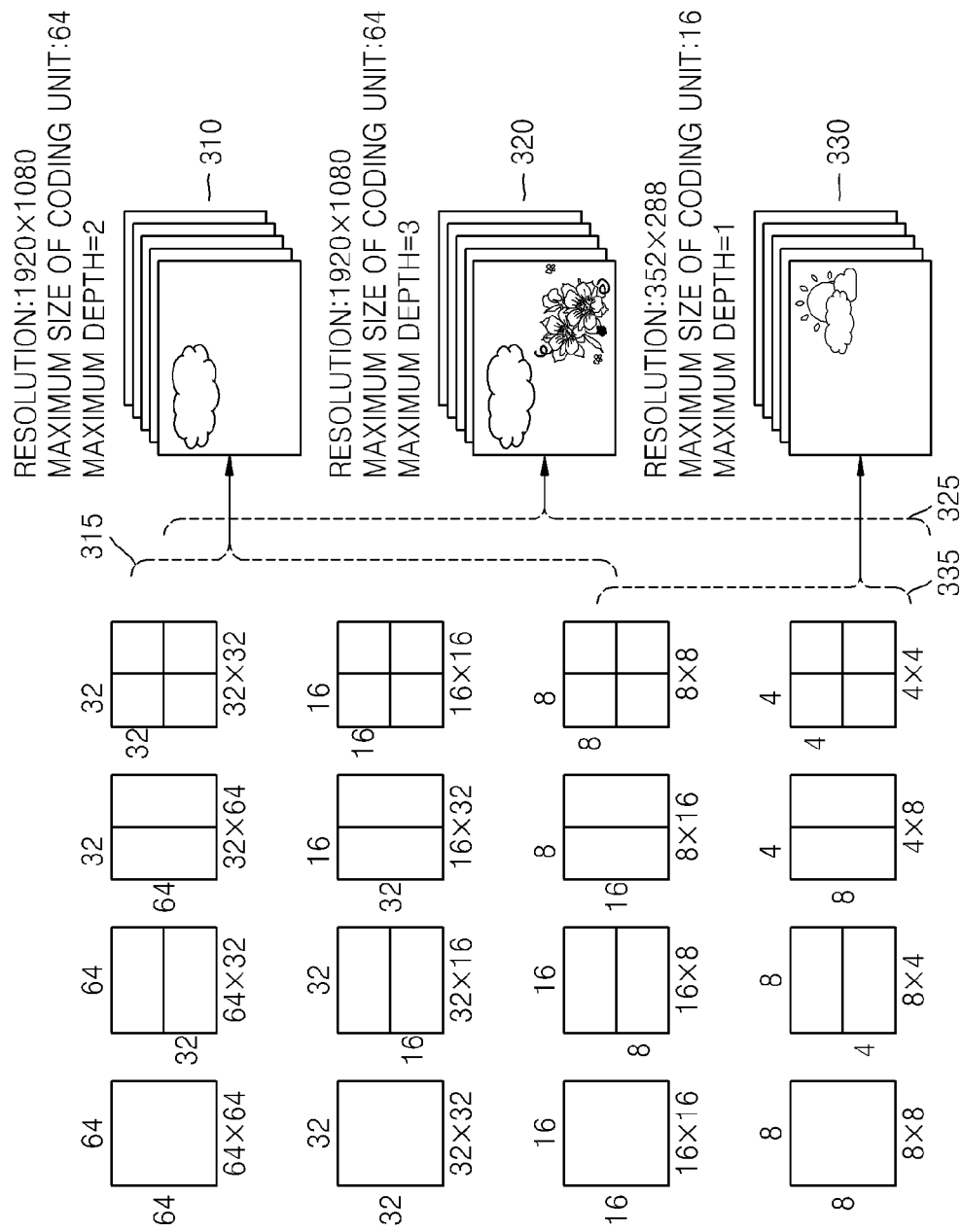
FIG. 3 illustrates hierarchical coding units according to an exemplary embodiment.

FIG. 3 illustrates hierarchical coding units according to an exemplary embodiment.

Referring to FIG. 3, the hierarchical coding units may include coding units whose widths and heights are 64×64, 32×32, 16×16, 8×8, and 4×4. Besides these coding units having perfect square shapes, coding units whose widths and heights are 64×32, 32×64, 32×16, 16×32, 16×8, 8×16, 8×4, and 4×8 may also exist.

Referring to FIG. 3, for image data set 310 whose resolution is 1920×1080, the size of a maximum coding unit is set to 64×64, and a maximum depth is set to 2.

For image data set 320 whose resolution is 1920×1080, the size of a maximum coding unit is set to 64×64, and a maximum depth is set to 3. For image data set 330 whose resolution is 352×288, the size of a maximum coding unit is set to 16×16, and a maximum depth is set to 1.

When the resolution is high or the amount of data is great, a maximum size of a coding unit may be set relatively great to increase a compression ratio and reflect image characteristics more precisely. Accordingly, for the image data sets 310 and 320 having higher resolution than the image data set 330, 64×64 may be selected as the size of a maximum coding unit.

A maximum depth indicates the total number of layers in the hierarchical coding units. Since the maximum depth of the image data set 310 is 2, a coding unit 315 of the image data set 310 may include a maximum coding unit whose longer axis size is 64 and sub coding units whose longer axis sizes are 32 and 16, according to an increase of a depth.

On the other hand, since the maximum depth of the image data set 330 is 1, a coding unit 335 of the image data set 330 may include a maximum coding unit whose longer axis size is 16 and coding units whose longer axis sizes is 8, according to an increase of a depth.

However, since the maximum depth of the image data 320 is 3, a coding unit 325 of the image data set 320 may include a maximum coding unit whose longer axis size is 64 and sub coding units whose longer axis sizes are 32, 16, 8 and 4 according to an increase of a depth. Since an image is encoded based on a smaller sub coding unit as a depth increases, exemplary embodiments are suitable for encoding an image including more minute scenes.

Figure 4:
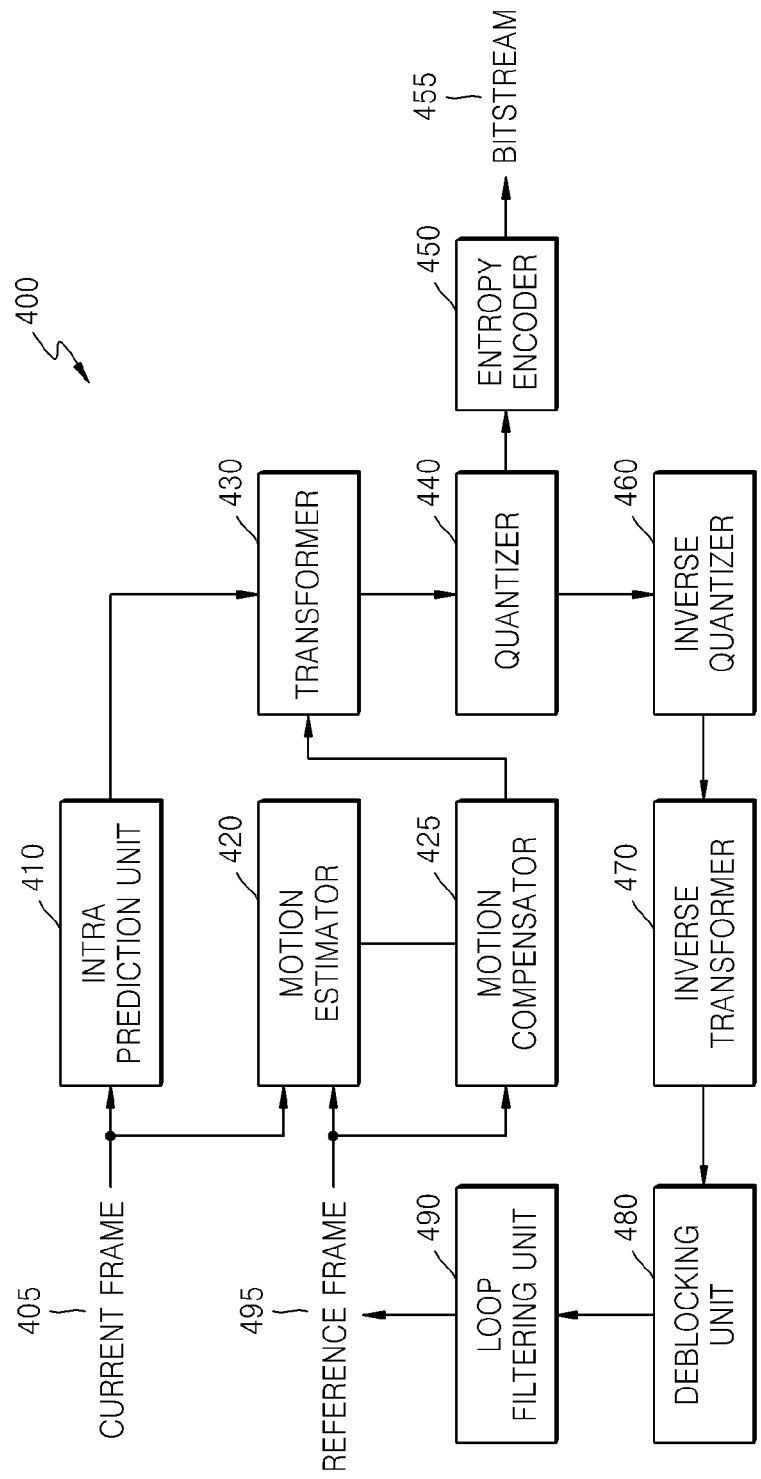
FIG. 4 is a block diagram of an image encoder, according to an exemplary embodiment.

FIG. 4 is a block diagram of an image encoder 400, according to an exemplary embodiment. The image encoder 400 may be implemented as a hardware device such as, for example, a processor of a computer or as a software module residing on the computer system. The image encoder 400 may include an intra prediction unit 410, a motion estimator 420, a motion compensator 425, a transformer 430, a quantizer 440, an entropy encoder 450, an inverse quantizer 460, an inverse transformer 470, a deblocking unit 480, and a loop filtering unit 490.

The intra prediction unit 410 performs intra prediction on prediction units of the intra mode in a current frame 405, and the motion estimator 420 and the motion compensator 425 perform inter prediction and motion compensation on prediction units of the inter mode using the current frame 405 and a reference frame 495. The intra prediction unit 410, the motion estimator 420, the motion compensator 425, and the reference frame 495 may be implemented, for example, as hardware or software modules integrated within the image encoder 400 or separately from the image encoder 400.

Residual values are generated based on the prediction units output from the intra prediction unit 410, the motion estimator 420, and the motion compensator 425. The generated residual values are output as quantized transform coefficients by passing through a transformer 430 and a quantizer 440.

The quantized transform coefficients are restored to residual values by passing through an inverse quantizer 460 and an inverse transformer 470. The restored residual values are post-processed by passing through a deblocking unit 480 and a loop filtering unit 490 and output as the reference frame 495. The quantized transform coefficients may be output as a bitstream 455 by passing through an entropy encoder 450.

To perform encoding based on an encoding method according to an exemplary embodiment, the intra prediction unit 410, the motion estimator 420, the motion compensator 425, the transformer 430, the quantizer 440, the entropy encoder 450, the inverse quantizer 460, the inverse transformer 470, the deblocking unit 480, and the loop filtering unit 490 of the image encoder 400 perform image encoding processes based on a maximum coding unit, a sub coding unit according to depths, a prediction unit, and a transform unit.

Figure 5:
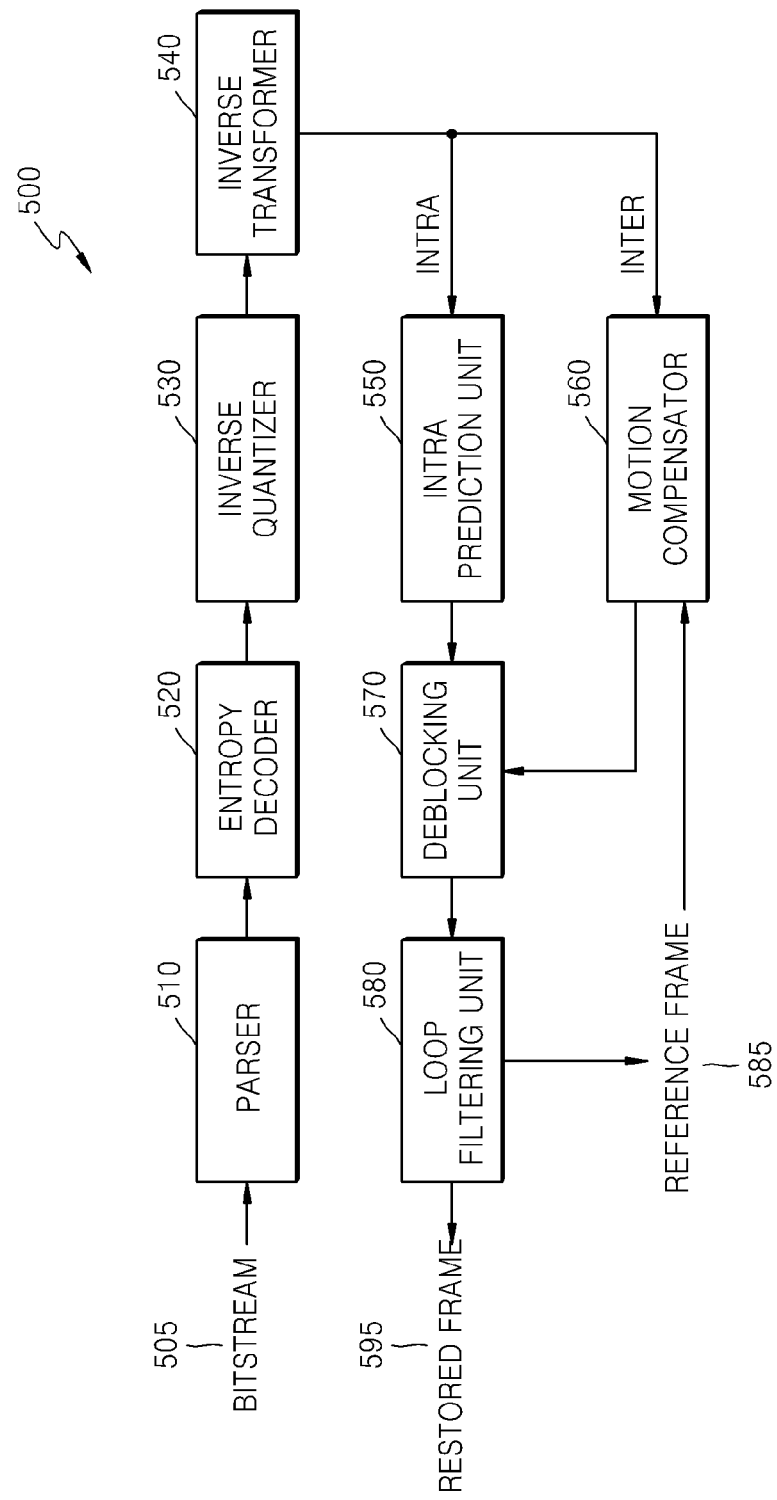
FIG. 5 is a block diagram of an image decoder, according to an exemplary embodiment.

FIG. 5 is a block diagram of an image decoder 500, according to an exemplary embodiment. The image decoder 500 may be implemented as a hardware device such as, for example, a processor of a computer or as a software module residing on the computer system. The image decoder 500 may include a parser 510, an entropy decoder 520, an inverse quantizer 530, an inverse transformer 540, an intra prediction unit 550, a motion compensator 560, a deblocking unit 570, and a loop filtering unit 580.

A bitstream 505 passes through the parser 510 that parses the encoded image data to be decoded and encoding information necessary for decoding. The encoded image data is output as inverse-quantized data by passing through the entropy decoder 520 and the inverse quantizer 530, and restored to residual values by passing through the inverse transformer

540. The residual values are restored according to coding units by being added to an intra prediction result of an intra prediction unit 550 or a motion compensation result of a motion compensator 560. The restored coding units are used for prediction of next coding units or a next frame by passing through a deblocking unit 570 and a loop filtering unit 580. The parser 510, the entropy decoder 520, the inverse quantizer 530, the inverse transformer 540, the intra prediction unit 550, the compensator 560, the deblocking unit 570, and the loop filtering unit 580 may be implemented, for example, as hardware or software modules integrated within the image decoder 500 or separately from the image decoder 500.

To perform decoding based on a decoding method according to an exemplary embodiment, the parser 510, the entropy decoder 520, the inverse quantizer 530, the inverse transformer 540, the intra prediction unit 550, the motion compensator 560, the deblocking unit 570, and the loop filtering unit 580 of the image decoder 500 perform image decoding processes based on a maximum coding unit, a sub coding unit according to depths, a prediction unit, and a transform unit.

In particular, the intra prediction unit 550 and the motion compensator 560 determine a prediction unit and a prediction mode in a sub coding unit by considering a maximum coding unit and a depth, and the inverse transformer 540 performs inverse transform by considering the size of a transform unit.

Figure 6:
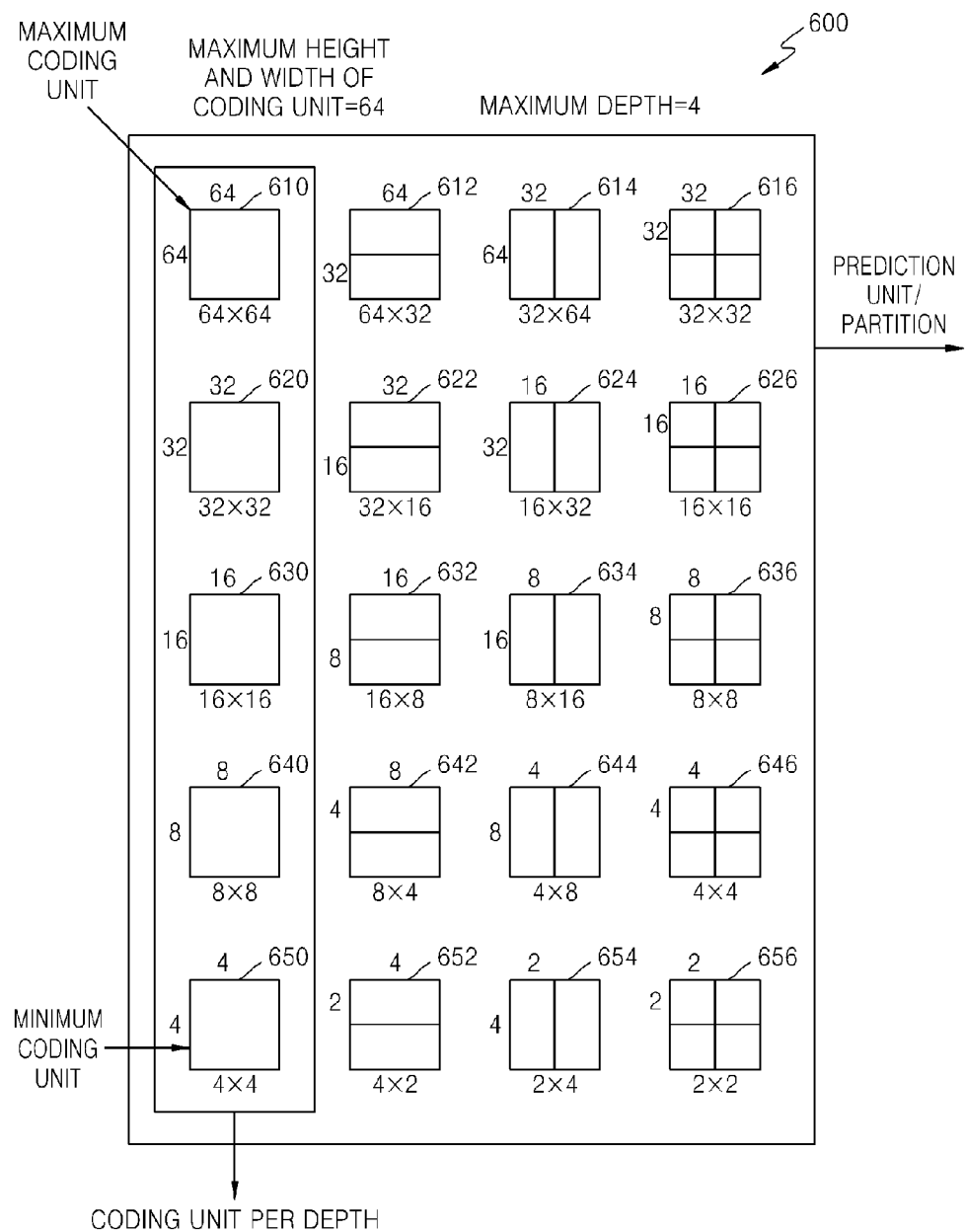
FIG. 6 illustrates a hierarchical coding unit structure, according to an exemplary embodiment.

FIG. 6 illustrates a hierarchical coding unit structure, according to an exemplary embodiment.

The image encoding apparatus 100 illustrated in FIG. 1 and the image decoding apparatus 200 illustrated in FIG. 2 use hierarchical coding units to perform encoding and decoding in consideration of image characteristics. A maximum coding unit and a maximum depth may be adaptively set according to the image characteristics or variously set according to requirements of a user.

In FIG. 6, a hierarchical coding unit structure 600 has a maximum coding unit 610 which is a maximum coding unit whose height and width are 64 and maximum depth is 4. A depth increases along a vertical axis of the hierarchical coding unit structure 600, and as a depth increases, heights and widths of sub coding units 620 to 650 decrease. Prediction units of the maximum coding unit 610 and the sub coding units 620 to 650 are shown along a horizontal axis of the hierarchical coding unit structure 600.

The maximum coding unit 610 has a depth of 0 and the size of an coding unit, or a height and a width, of 64×64. A depth increases along the vertical axis, and there exist a first sub coding unit 620 whose size is 32×32 and depth is 1, a second sub coding unit 630 whose size is 16×16 and depth is 2, a third sub coding unit 640 whose size is 8×8 and depth is 3, and a minimum coding unit 650 whose size is 4×4 and depth is 4. The minimum coding unit 650 whose size is 4×4 and depth is 4 is a minimum coding unit, and the minimum coding unit may be divided into prediction units, each of which is less than the minimum coding unit.

Referring to FIG. 6, examples of prediction units are shown along the horizontal axis according to each depth. That is, a prediction unit of the maximum coding unit 610 whose depth is 0 may be a prediction unit whose size is equal to the size 64×64 of the maximum coding unit, or a prediction unit 612 whose size is 64×32, a prediction unit 614 whose size is 32×64, or a prediction unit 616 whose size is 32×32, which has a size smaller than that of the maximum coding unit whose size is 64×64.

A prediction unit of the first sub coding unit 620 whose depth is 1 and size is 32×32 may be a prediction unit whose size is equal to the size 32×32 of the first sub coding unit, or a prediction unit 622 whose size is 32×16, a prediction unit 624 whose size is 16×32, or a prediction unit 626 whose size is 16×16, which has a size smaller than that of the first sub coding unit 620 whose size is 32×32.

A prediction unit of the second sub coding unit 630 whose depth is 2 and size is 16×16 may be a prediction unit whose size is equal to the size 16×16 of the second sub coding unit 630, or a prediction unit 632 whose size is 16×8, a prediction unit 634 whose size is 8×16, or a prediction unit 636 whose size is 8×8, which has a size smaller than that of the second sub coding unit 630 whose size is 16×16.

A prediction unit of the third sub coding unit 640 whose depth is 3 and size is 8×8 may be a prediction unit whose size is equal to the size 8×8 of the third sub coding unit 640 or a prediction unit 642 whose size is 8×4, a prediction unit 644 whose size is 4×8, or a prediction unit 646 whose size is 4×4, which has a size smaller than that of the third sub coding unit 640 whose size is 8×8.

The minimum coding unit 650 whose depth is 4 and size is 4×4 is a minimum coding unit and a coding unit of a maximum depth. A prediction unit of the minimum coding unit 650 may be a prediction unit 650 whose size is 4×4, a prediction unit 652 having a size of 4×2, a prediction unit 654 having a size of 2×4, or a prediction unit 656 having a size of 2×2.

Figure 7:
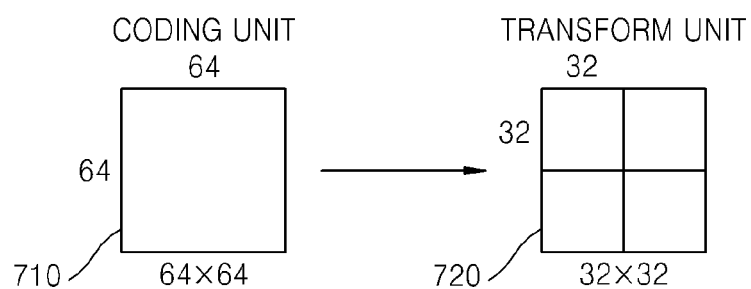
FIG. 7 illustrates a coding unit and a transform unit, according to an exemplary embodiment.

FIG. 7 illustrates a coding unit and a transform unit, according to an exemplary embodiment.

The image encoding apparatus 100 illustrated in FIG. 1 and the image decoding apparatus 200 illustrated in FIG. 2 perform encoding and decoding with a maximum coding unit or with sub coding units, which have size equal to or smaller than the maximum coding unit, divided from the maximum coding unit. In the encoding and decoding process, the size of a transform unit for frequency transform is selected to be no larger than that of a corresponding coding unit. For example, if a current coding unit 710 has the size of 64×64, frequency transform may be performed using a transform unit 720 having the size of 32×32.

FIGS. 8A, 8B, 8C, and 8D illustrate division shapes of a coding unit, a prediction unit, and a transform unit, according to an exemplary embodiment.

Figure 8A:
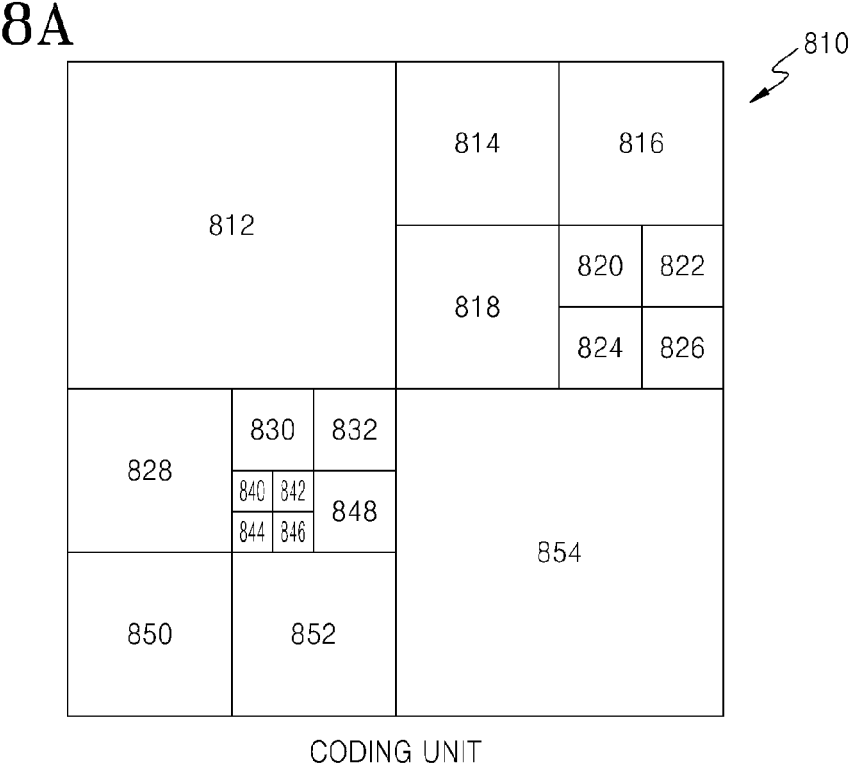
FIGS. 8A through 8D illustrate a coding unit, a prediction unit, and a transform unit, according to an exemplary embodiment.
Figure 8B:
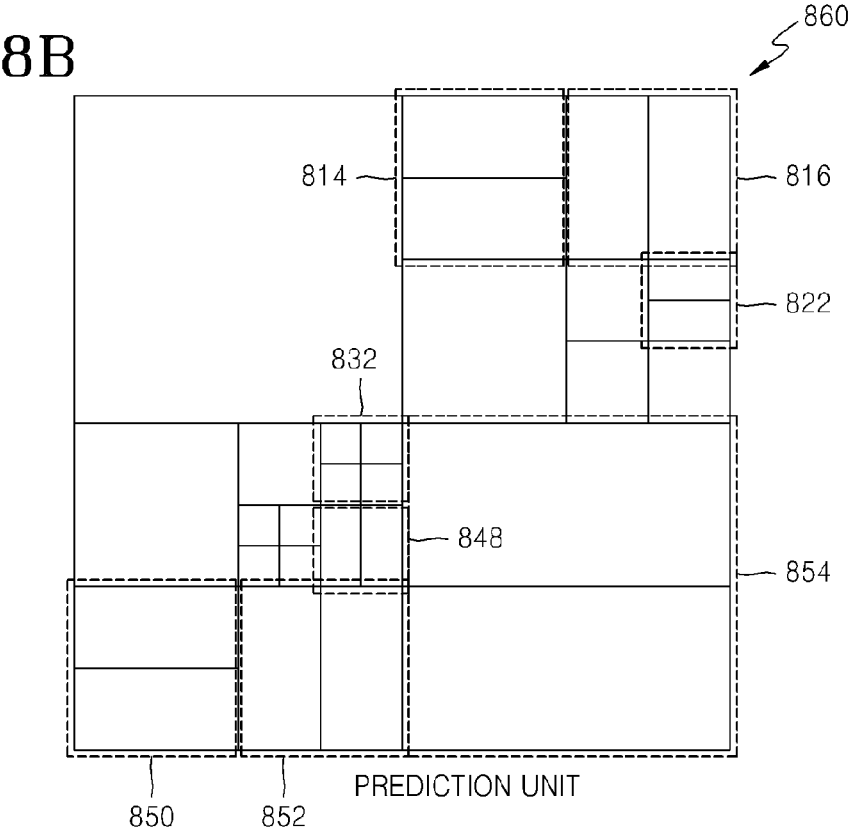

FIGS. 8A and 8B illustrate a coding unit and a prediction unit, according to an exemplary embodiment.

FIG. 8A shows a division shape selected by the image encoding apparatus 100 illustrated in FIG. 1, to encode a maximum coding unit 810. The image encoding apparatus 100 divides the maximum coding unit 810 into various shapes, performs encoding, and selects an optimal division shape by comparing encoding results of various division shapes with each other based on the RD costs. When it is optimal that the maximum coding unit 810 to be encoded, the maximum coding unit 810 may be encoded without dividing the maximum coding unit 810 as illustrated in FIGS. 8A through 8D.

Referring to FIG. 8A, the maximum coding unit 810 whose depth is 0 is encoded by dividing the maximum coding unit 810 into sub coding units whose depths are equal to or greater than 1. That is, the maximum coding unit 810 is divided into 4 sub coding units whose depths are 1, and all or some of the sub coding units whose depths are 1 are divided into sub coding units 814, 816, 818, 828, 850, and 852 whose depths are 2.

A sub coding unit located in an upper-right side and a sub coding unit located in a lower-left side among the sub coding units whose depths are 1 are further divided into sub coding units whose depths are equal to or greater than 2. Some of the sub coding units whose depths are equal to or greater than 2 may be divided into sub coding units 820, 822, 824, 826, 830, 832, 840, 842, 844, 846, and 848 whose depths are equal to or greater than 3.

FIG. 8B shows a division shape of a prediction unit for the maximum coding unit 810.

Referring to FIG. 8B, a prediction unit 860 for the maximum coding unit 810 may be divided differently from the maximum coding unit 810. In other words, a prediction unit for each of sub coding units may be smaller than a corresponding sub coding unit.

For example, a prediction unit for a sub coding unit 854 located in a lower-right side among the sub coding units 812, 854 whose depths are 1 may be smaller than the sub coding unit 854. In addition, prediction units for sub coding units 814, 816, 850, and 852 of sub coding units 814, 816, 818, 828, 850, and 852 whose depths are 2 may be smaller than the sub coding units 814, 816, 850, and 852, respectively.

In addition, prediction units for sub coding units 822, 832, and 848 whose depths are 3 may be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

Figure 8C:
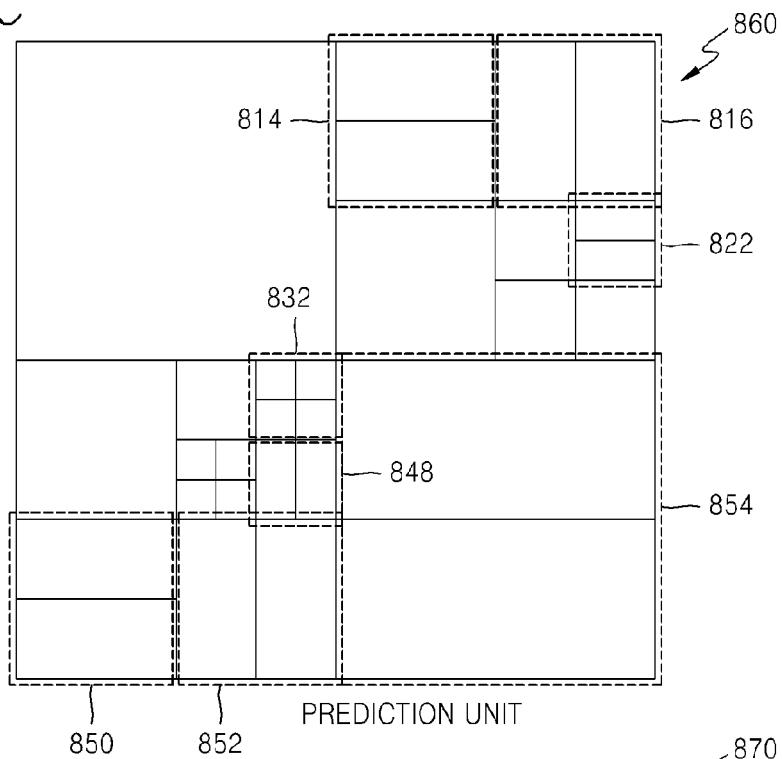
Figure 8D:
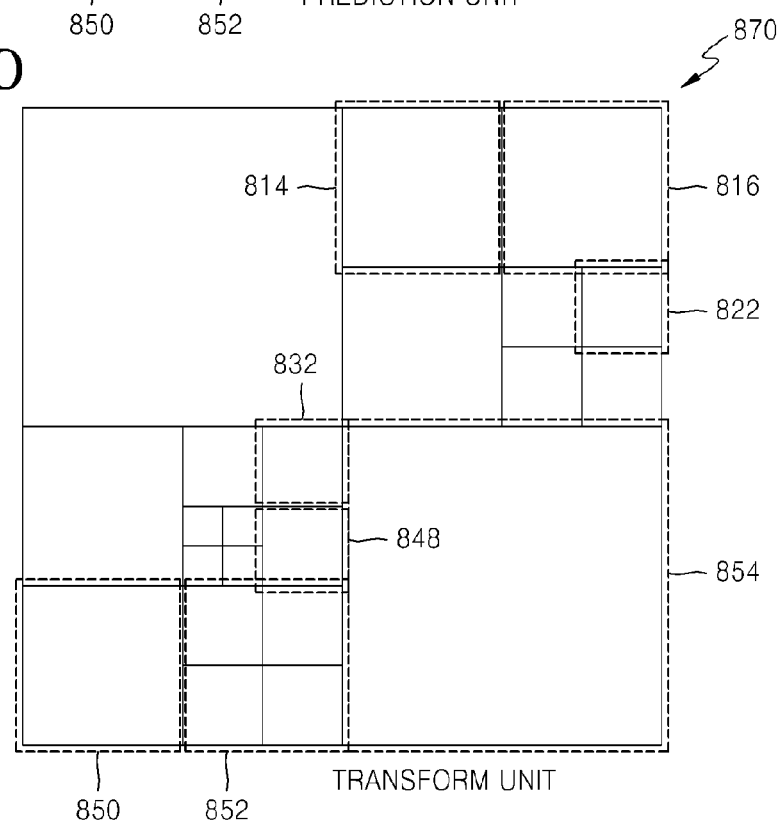

FIGS. 8C and 8D illustrate a prediction unit and a transform unit, according to an exemplary embodiment.

FIG. 8C shows a division shape of a prediction unit for the maximum coding unit 810 shown in FIG. 8B, and FIG. 8D shows a division shape of a transform unit of the maximum coding unit 810.

Referring to FIG. 8D, a division shape of a transform unit 870 may be set differently from the prediction unit 860.

For example, even though a prediction unit for the sub coding unit 854 whose depth is 1 is selected with a shape whereby the height of the sub coding unit 854 is equally divided by two, a transform unit may be selected with the original size of the sub coding unit 854. Likewise, even though prediction units for sub coding units 814 and 850 whose depths are 2 are selected with a shape whereby the height of each of the sub coding units 814 and 850 is equally divided by two, a transform unit may be selected with the same size as the original size of each of the sub coding units 814 and 850.

A transform unit may be selected with a smaller size than a prediction unit. For example, when a prediction unit for the sub coding unit 852 whose depth is 2 is selected with a shape whereby the width of the sub coding unit 852 is equally divided by two, a transform unit may be selected with a shape whereby the sub coding unit 852 is equally divided by four in directions of height and width, which has a smaller size than the shape of the prediction unit.

FIG. 9 is a block diagram of an apparatus 900 for encoding an image, according to an exemplary embodiment.

Referring to FIG. 9, the image encoding apparatus 900 includes a prediction unit 910, and an encoder 920. In addition, the prediction unit 910 includes a segmentation unit 912 and a prediction performing unit 914.

The prediction unit 910 predicts a second color component block by setting a plurality of segments of the second color component block of a current block based on pixel values of a first color component block of the current block and then individually predicting the segments. The current block may correspond to the above-described prediction unit. In addition, when a coding unit and a prediction unit are the same, the current block may correspond to the coding unit.

In general image encoding/decoding methods, an image is divided into a plurality of color components, and is encoded/decoded. The image is divided into a red (R) pixel value, a green (G) pixel value, and a blue (B) pixel value, according to a RGB format by which an image is divided according to a kind of a color, and then is encoded/decoded, or the image is divided into a luminance (Y) pixel value, a blue-difference chroma (Cb) pixel value, and a red-difference chroma (Cr) pixel value, according to a YUV format by which an image is divided into a luminance component and a chroma component, and then is encoded/decoded.

A plurality of color components of a pixel is likely to be similar to those of a neighboring pixel, respectively. For example, when an R pixel value of a pixel is similar to that of a neighboring pixel, a G pixel value and a B pixel value of the pixel are likely to be similar to those of the neighboring pixel, respectively. In addition, when a Y pixel value of a pixel is similar to that of a neighboring pixel, a Cb pixel value and a Cr pixel value of the pixel are likely to be similar to those of the neighboring pixel, respectively.

Thus, the prediction unit 910 according to the present exemplary embodiment divides a current color component block that is currently encoded into a plurality of segments based on pixel values of another color component block that is encoded prior to the current color component, and predicts the current color component block. Alternatively, the current color component block may be divided based on prediction values or residual values that is generated when another color component block is encoded prior to the current color component block. The current color component block is predicted by dividing the current color component block into a plurality of segments and predicting the segments by using different context pixel values, but not by predicting the current color component block as a single block, thereby increasing the accuracy of the prediction. As the accuracy of the prediction increases, an image may be compressed with an increased compression rate. Hereinafter, segmentation and prediction of the prediction unit 910 will be described in more detail with reference to the drawings.

FIGS. 10A and 10B show pixel values of a first color component block 1010, and segmentation of a second color component block based on the pixel values of the first color component block 1010, respectively, according to an exemplary embodiment.

Referring to FIG. 10A, when it is assumed that a first color component is a luminance component, and a current block is a 4×4 block, the first color component block 1010 of the current block includes 16 Y pixel values from $Y_0$ to $Y_{15}$. The first color component block 1010 of the current block is a block that is encoded prior to the second color component block and then is restored again. A second color component may be a chroma component.

The segmentation unit 912 of the prediction unit 910 sets a plurality of segments of the second color component block of the current block based on the pixel values of the first color component block 1010. The segmentation unit 912 sets a predetermined reference value and compares the set reference value with the pixel values of the first color component block 1010 to set a plurality of segments of the first color component block 1010. The plurality of segments of the second color component block are set based on the plurality of segments of the first color component block 1010. Information regarding the reference value may be encoded explicitly and transmitted to decoding side. However, the information regarding the reference value may not be encoded explicitly when the reference value is set according to a rule shared by encoding side and decoding side.

For example, the segmentation unit 912 calculates a mean of the pixel values of the first color component block 1010, and sets the reference value as the mean. When a pixel has a pixel value that is equal to or smaller than the mean, the pixel may be set as a first portion. When a pixel has a pixel value that is greater than the mean, the pixel may be set as a second portion. When the mean of pixel values is not an integer, an integer is obtained by rounding off, rounding up, or rounding down the mean, and then is compared with the pixel values. The first portion may correspond to a pixel 'Seg0' or a pixel 'Seg1' of FIG. 10B. If the first portion corresponds to the pixel 'Seg0', the second portion corresponds to the pixel 'Seg1'. If the first portion corresponds to the pixel 'Seg1', the second portion corresponds to the pixel 'Seg0'.

After the plurality of segments of the first color component block 1010 are set, the plurality of segments are refined. A mean of pixels 'Seg0' is calculated by averaging pixel values of the pixels 'Seg0', and a mean of pixels 'Seg1' by averaging pixel values of the pixels 'Seg1'. Then, the pixel values of the first color component block 1010 are compared with each of the mean of the pixels 'Seg0' and the mean of the pixels 'Seg1'.

With regard to a predetermined pixel, when an absolute value of a difference between a pixel value of the pixel and the mean of the pixels 'Seg0' is smaller than an absolute value of a difference between the pixel value of the pixel and the mean of the pixels 'Seg1', the pixel is set as 'Seg0'. When the absolute value of the difference between the pixel value of the pixel and the mean of the pixels 'Seg0' is equal to or greater than the absolute value of the difference between the pixel value of the pixel and the mean of the pixels 'Seg1', the pixel is set as 'Seg1'. Likewise, the plurality of segments of the first color component block 1010 are refined. Accurate segmentation may be performed by refining the plurality of segments a plurality of times.

As illustrated in FIG. 10B, after the plurality of segments of the first color component block 1010 are set, the segmentation unit 912 sets the plurality of segments of the second color component block based on the plurality of segments of the first color component block 1010. The plurality of segments of the second color component block may be set to be the same as the plurality of segments of the first color component block 1010, which are set as illustrated in FIG. 10B.

In FIG. 10B, the first color component block 1010 are divided into two kinds of parts of the pixels 'Seg0' and 'Seg1'. However, it will be understood by those of ordinary skill in the art that the first color component block 1010 may be divided into at least three kinds of parts. According to FIGS. 10A and 10B the first color component block 1010 are divided implicitly based on the second color component block. Thus, information regarding the segmentation is not encoded and transmitted to decoding side. However, according to another exemplary embodiment, information regarding the segmentation may be encoded explicitly and transmitted to decoding side.

Figure 11:
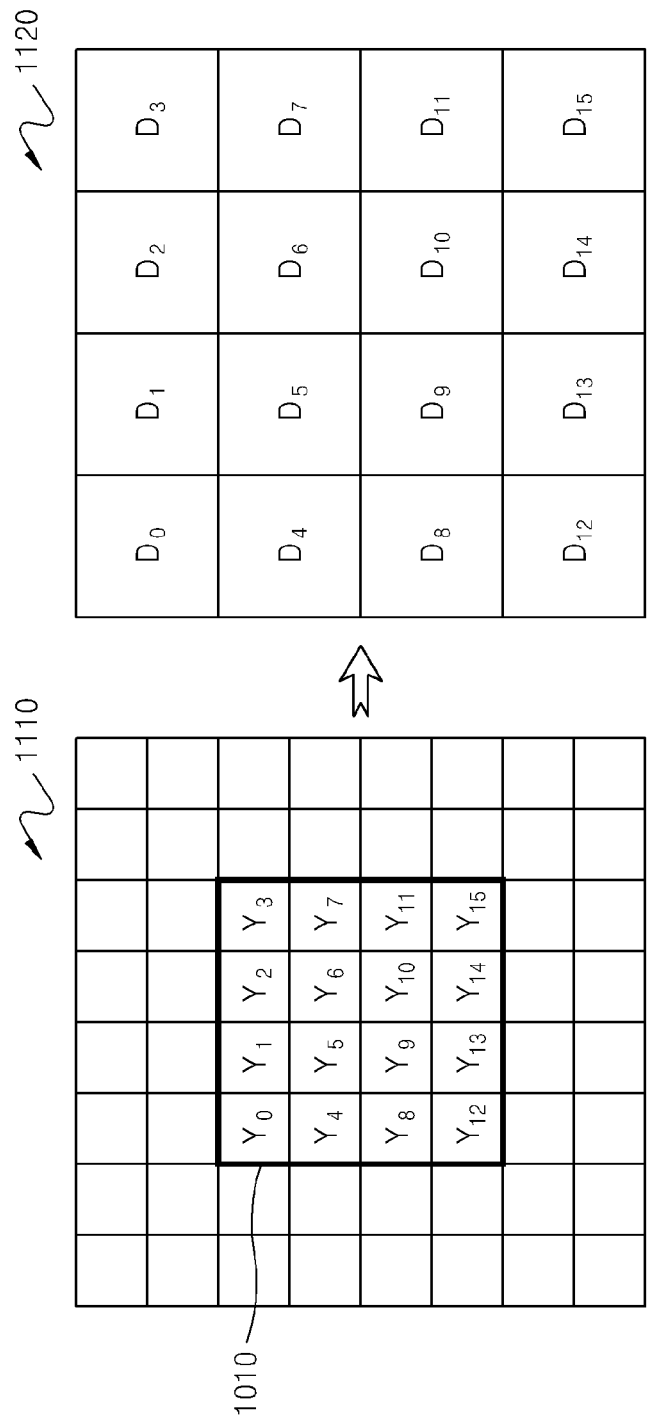
FIG. 11 is a diagram of segmentation by using a block having a larger size than a current block, according to an exemplary embodiment

FIG. 11 is a diagram of segmentation by using a block having a larger size than a current block, according to an exemplary embodiment.

Referring to FIG. 11, when the segmentation unit 912 sets a plurality of segments of a second color component block, a first color component block 1110 having a larger size than the current block may be used. Since more accurate segmentation may be performed by using more references when the plurality of segments of the second color component block are set, the plurality of segments of the second color component block are set using the first color component block 1110 having a larger size than the first color component block 1010 of the current block.

The segmentation unit 912 sets the plurality of segments of the second color component block by using the first color component block 1110 having a larger size than the first color component block 1010 of the current block, illustrated in FIG. 10A. When the first color component block 1010 has a size of 2N×2M, the segmentation unit 912 may use the first color component block 1110 having a size of 4N×4M that is two times the size of the first color component block 1010 in horizontal and vertical directions. N and M are positive integers, and may be the same.

A down-sampled block 1120 may be generated by down-sampling the first color component block 1110 in units of 4 pixels, and the plurality of segments of the second color component block may be set based on pixel values of the down-sampled block 1120.

For example, the segmentation unit 912 calculates a mean of pixel values of the down-sampled block 1120, and sets a reference value as the mean. With regard to a predetermined pixel, when a pixel value of the pixel is equal to or smaller than the mean, the pixel is set as a first portion. When the pixel value of the pixel is greater than the mean, the pixel is set as a second portion. As a result of the setting, as illustrated in FIG. 10B, a plurality of segments of the down-sampled block 1120 having a size of 2N×2M may be set. Then, the segmentation unit 912 may set a plurality of segments of the second color component block to be the same as the plurality of segments of the down-sampled block 1120. As described with reference to FIGS. 10A and 10B, when the mean of pixel values is not an integer, an integer may be obtained by rounding off, rounding up, or rounding down the mean, and then may be compared with the pixel values. In addition, when the plurality of segments of the down-sampled block 1120 are set, accurate segmentation may be performed by refining the plurality of segments at least one time.

Figure 12:
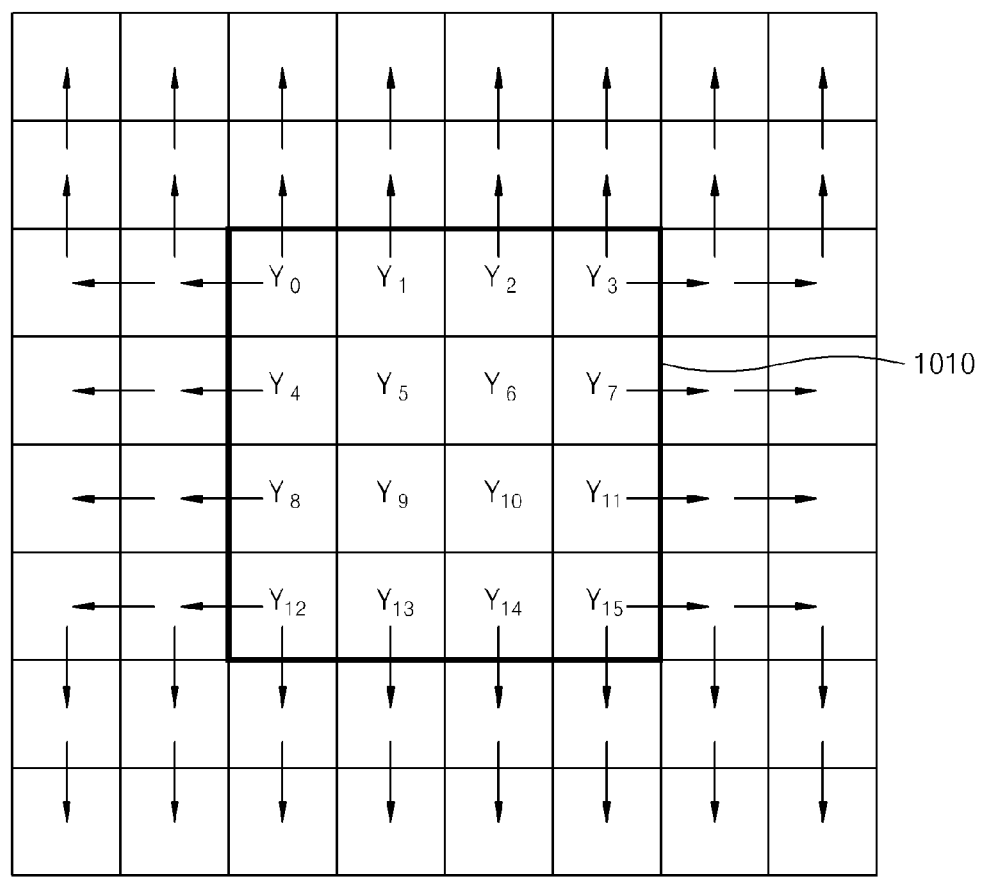
FIG. 12 is a diagram for explaining a method of generating a first color component block having a larger size than a current block, according to an exemplary embodiment.

FIG. 12 is a diagram for explaining a method of generating a first color component block 1110 having a larger size than a current block, according to an exemplary embodiment.

As described with reference to FIG. 11, in order to set the plurality of segments of the second color component block by using the first color component block 1110 having a larger size than the current block, the segmentation unit 912 may first determine the first color component block 1110.

However, it may be impossible to use some neighboring pixels of the first color component block 1010 of the current block in order to encode the current block. When an image is encoded by performing raster scanning on blocks of an image frame in a direction from an upper-left side to a lower-right side, it is not possible to use pixels adjacent to a right side, a lower-right side, and a lower side of the current block in order to encode the current block. In other words, since the pixels of the right side, the lower-right side, and the lower side of the first color component block 1010 have not yet been encoded, the segmentation unit 912 may not use those pixels in order to determine the first color component block 1110 having a larger size than the current block.

In addition, when the current block is positioned at a left boundary of the image frame, since pixels adjacent to a left side of the current block deviate from the image frame, the segmentation unit 912 may not use those pixels in order to determine the first color component block 1110 having a larger size than the current block. Likewise, when the current block is positioned at an upper boundary, a right boundary, or a lower boundary of the image frame, pixels adjacent to a predetermined portion may not be used to determine the first color component block 1110 having a larger size than the current block.

Thus, in order to overcome this problem, the segmentation unit 912 may determine the first color component block 1110 having a larger size than the current block by using pixel values of pixels adjacent to a boundary of the first color component block 1010 from among pixel values of pixels included in the first color component block 1010 of the current block.

The pixel values $Y_0, Y_1, Y_2, Y_3, Y_4, Y_7, Y_8, Y_{11}, Y_{12}, Y_{13}, Y_{14}$ and $Y_{15}$ of the pixels adjacent to the boundary of the first color component block 1010 may be copied and depicted in directions indicated by arrows of FIG. 12 to determine the first color component block 1110 having a larger size than the current block. The first color component block 1110 having a larger size than the current block may be determined by padding some neighboring pixels of the first color component block 1010 of the current block, which are not capable of being used to encode the current block, with the pixels adjacent to the boundary of the first color component block 1010.

Figure 13:
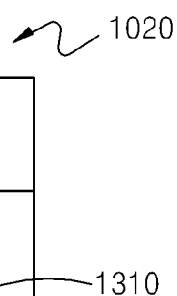
FIG. 13 is a diagram of segmentation of a second color component block having a smaller size than a first color component block, according to an exemplary embodiment.

FIG. 13 is a diagram of segmentation of a second color component block having a smaller size than a first color component block 1010, according to an exemplary embodiment.

When an image is encoded/decoded, a plurality of color component blocks may be encoded to have different sizes. When an image is encoded/decoded according to a YUV format, Y:Cb:Cr may be set to be 4:2:2, 4:2:0, or 4:0:2, but not 4:4:4, and the image may be encoded. Since a difference between pixel values of chroma components is small, and image quality perceived by a user may not seriously deteriorate due to errors of the chroma components, the chroma components are encoded in a coding unit having a smaller size than a current coding unit.

Likewise, when the second color component block having a smaller size than the first color component block 1010 is encoded, the segmentation unit 912 sets a plurality of segments of the second color component block by using a method different from the one shown in FIG. 10B.

Referring to FIG. 13, first, the segmentation unit 912 sets a plurality of segments 1020 of the first color component block 1010 based on the pixel values of the first color component block 1010 or the down-sampled block 1120, as illustrated in FIG. 10B. Then, a plurality of segments 1310 of a small block positioned in a central portion of the plurality of segments 1020 of the first color component block 1010 are set as a plurality of segments of the second color component block.

When the size of the first color component block 1010 is 2N×2M, and the size of the second color component block is N×M, the plurality of segments 1310 of a N×M size block positioned in the central portion of the first color component block 1010 are set as the plurality of segments of the second color component block. Likewise, it will be understood by one of ordinary skill in the art that, when segmentation is performed using the first color component block 1110 having a larger size than the current block, like in FIG. 11, a plurality of segments of a N×M size block positioned in a central portion of the down-sampled block 1120 having a size of 2N×2M are set as the plurality of segments of the second color component block.

Referring back to FIG. 9, when the plurality of segments of the second color component block are set by the segmentation unit 912, the prediction performing unit 914 predicts the plurality of segments of the second color component block, which are set by the segmentation unit 912. The plurality of segments of the second color component block are individually predicted using context pixels adjacent to the respective segments, but the current block is not predicted as a single block by using the same neighboring pixels. The context pixels are pixels adjacent to the current block and are included in a region that is encoded prior to the current block. The context pixels are pixels that are encoded prior to the current block and then restored again. A method of individually encoding a plurality of segments will be described in detail with reference to FIGS. 14A and 14B.

FIGS. 14A and 14B are diagrams for explaining a method of predicting a second color component block, according to an exemplary embodiment.

Referring to FIG. 14A, when a plurality of segments of the second color component block are set as illustrated in FIG. 10B, the second color component block may be predicted by using pixel values of context pixels, that is, pixel values $N_0$ through $N_{10}$ of second color component pixels that are adjacent to the second color component block and are included in a region that is encoded prior to the current block. In this case, pixels 'Seg0' and 'Seg1' are predicted using different context pixels.

In FIG. 14A, when the pixel 'Seg0' is predicted, the pixel values $N_0$ through $N_7$ of the second color component pixels are used. When the pixel 'Seg1' is predicted, the pixel values $N_8$ through $N_{10}$ are used. The pixel values $N_0$ through $N_7$ and the pixel values $N_8$ through $N_{10}$ are determined implicitly based on segmentation. Alternatively, at least one of information for specifying the pixel values $N_0$ through $N_7$ and information for specifying the pixel values $N_8$ through $N_{10}$ may be encoded explicitly and transmitted to decoding side. A mean of the pixel values $N_0$ through $N_7$ may be used as a prediction value of the pixel 'Seg0', and a mean of the pixel values $N_8$ through $N_{10}$ may be used as a prediction value of the 'Seg1'.

Each of the means used for prediction may be any one of an arithmetic mean, a geometric mean, and a harmonic mean, or may be a mean calculated by adding different weight values to the respective pixel values $N_0$ through $N_{10}$. When a mean of pixel values is not an integer, an integer may be obtained by rounding off, rounding up, or rounding down the mean, and then may be used as the prediction value.

A mean used as the prediction value is just an example, and thus any method of predicting a plurality of segments by using respective different methods based on the pixel values $N_0$ through $N_{10}$ may be used to perform prediction according to one or more exemplary embodiments. For example, a median of the pixel values $N_0$ through $N_7$ may be used as the prediction value of the pixel 'Seg0', and a median of the pixel values $N_8$ through $N_{10}$ may be used as the prediction value of the pixel 'Seg1'. In addition, only maximum and minimum values of the pixel values $N_0$ through $N_7$ are extracted, and an intermediate value of the maximum and minimum values is used as the prediction values of the pixel 'Seg0'. Only maximum and minimum values of the pixel values $N_8$ through $N_{10}$ are extracted, and an intermediate value of the maximum and minimum values are used as the prediction value of the pixel 'Seg1'. Information regarding a representative value used as the prediction value is not encoded if the representative value is calculated based on a rule shared by encoding side and decoding side. However, according to another exemplary embodiment, the information regarding the representative value may be encoded explicitly and transmitted to decoding side.

FIG. 14B is a diagram for explaining the method of predicting the second color component block when the plurality of segments of the second color component block are set based on a plurality of segments of a block positioned in a central portion of the first color component block since the second color component block has a smaller size than the first color component block, as illustrated in FIG. 13.

As illustrated in FIG. 13, when the second color component block has a smaller size than the first color component block, the number of pixels adjacent to the second color component block is smaller than in FIG. 14A. However, a method of individually predicting the plurality of segments of the second color component block by using pixel values of pixels adjacent to the respective segments is common to FIGS. 13 and 14A, and thus the pixel 'Seg0' is predicted using the pixel values $N_0$ through $N_4$, and the pixel 'Seg1' is predicated using the pixel values $N_6$ through $N_7$.

Referring back to FIG. 9, the encoder 920 encodes the second color component block based on a prediction result of the prediction unit 910. A residual block is generated by subtracting the prediction block of the second color component block, which is generated as a prediction result on the second color component block, from the second color component block of the current block. Frequency domain coefficients are generated by transforming the generated residual block into a frequency domain, and the generated frequency domain coefficients are quantized and entropy-encoded. The frequency domain transform may be performed using a discrete cosine transform, or a Hadamard transform or a KLT.

Figure 15:
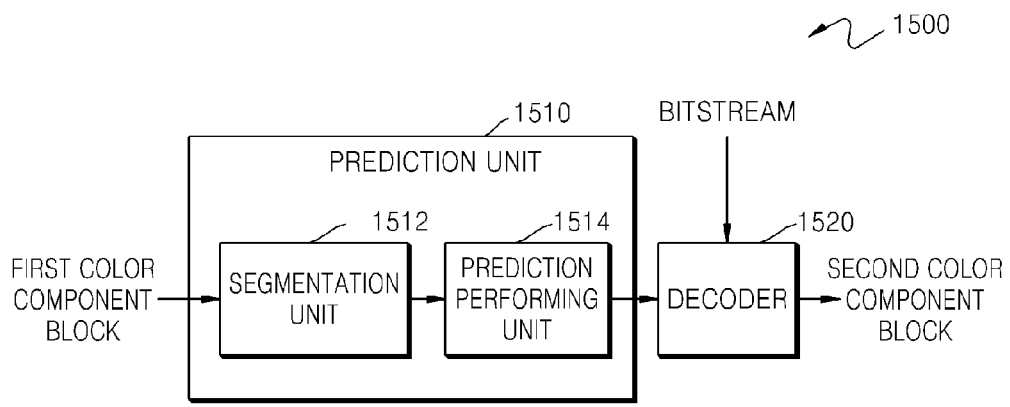
FIG. 15 is a block diagram of an apparatus for decoding an image, according to an exemplary embodiment.

FIG. 15 is a block diagram of an apparatus 1500 for decoding an image, according to an exemplary embodiment.

Referring to FIG. 15, the image decoding apparatus 1500 includes a prediction unit 1510, and a decoder 1520. In addition, the prediction unit 1510 includes a segmentation unit 1512 and a prediction performing unit 1514.

The prediction unit 1510 predicts a second color component block by setting a plurality of segments of the second color component block of a current block based on pixel values of a first color component block of the current block and then individually predicting the segments.

The segmentation unit 1520 sets the plurality of segments of the second color component block of the current block based on the pixel values of the first color component block 1010. The segmentation unit 1520 compares a predetermined reference value with pixel values of the first color component block 1010 to set the plurality of the first color component block 1010, and sets the plurality of the second color component block based on the plurality of segments of the first color component block 1010. A method of setting a plurality of segments is the same as the method described with reference to FIGS. 10A and 10B, 11, 12 and 13.

The prediction performing unit 1514 individually predicts the plurality of segments of the second color component block, which are set by the segmentation unit 1520. The plurality of segments are individually predicted by using context pixels adjacent to the respective segments. The context pixels are adjacent to the current block and are included in a region that is decoded prior to the current block. The context pixels are decoded prior to the current block, and then are restored again. As a prediction result, a prediction block of the second color component block of the current block is generated. A method of individually predicting a plurality of segments has been described with reference to FIGS. 14A and 14B.

The decoder 1520 decodes the second color component block based on a prediction result of the prediction unit 1510. Frequency domain coefficients are generated by entropy-decoding a bitstream of the second color component block of the current block. Pixel values of a pixel domain are restored by inverse-quantizing the frequency domain coefficients and then performing inverse-transform based on the frequency domain coefficients. The second color component block of the current block is restored by adding a residual block of the second color component block, which is generated as a restoration result, and the prediction value generated in the prediction unit 1510. The inverse-transform may be performed using a discrete cosine transform, or a Hadamard transform or a KLT.

Figure 16:
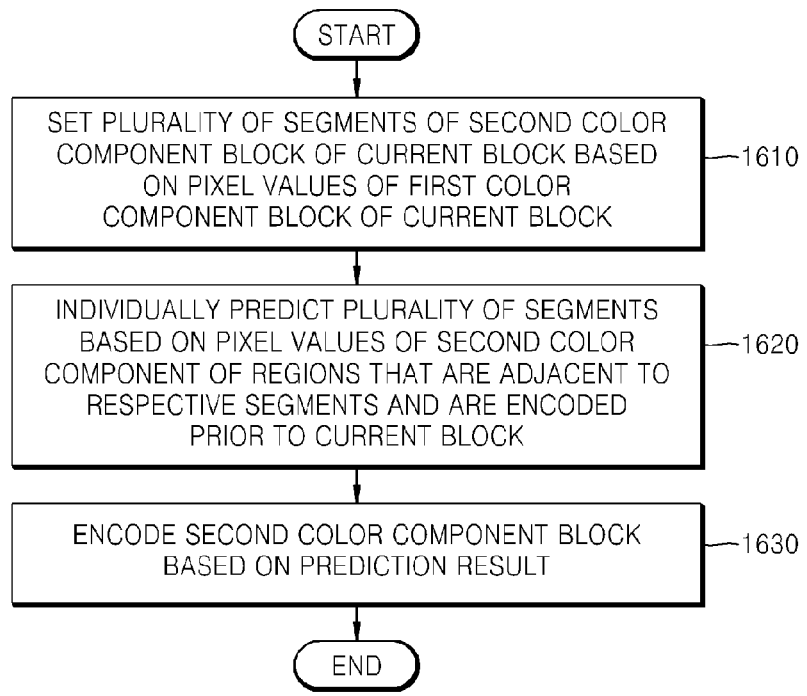
FIG. 16 is a flowchart of a method of encoding an image, according to an exemplary embodiment.

FIG. 16 is a flowchart of a method of encoding an image, according to an exemplary embodiment.

Referring to FIG. 16, in operation 1610, an image encoding apparatus according to an exemplary embodiment sets a plurality of segments of a second color component block of a current block based on pixel values of a first color component block of the current block.

The plurality of segments of the first color component block are set based on pixel values of the first color component block, which is encoded prior to the second color component block of the current block and then restored again, and the plurality of segments of the second color component block are set based on the plurality of segments of the first color component block. In order to accurately set the plurality of segments of the second color component block, a first color component block having a larger size than the current block is determined, a down-sampled block is generated by down-sampling the first color component block, and the plurality of segments of the second color component block are set based on a plurality of segments of the down-sampled block.

The plurality of segments of the second color component block may be set by setting a first portion and a second portion that are obtained by respectively comparing pixel values of the first color component block of the current block or down-sampled block with a predetermined reference value. In addition, the plurality of segments of the second color component block may be accurately divided by refining the plurality of segments of the first color component block or down-sampled block.

When the second color component block has a smaller size than the first color component block, a plurality of segments of a block positioned in a central portion of the first color component block of the current block or down-sampled block may be set as the plurality of segments of the second color component block. A method of setting a plurality of segments has been described with reference to FIGS. 10A, 10B, 11, 12, and 13.

In operation 1620, the image encoding apparatus individually predicts the plurality of segments set in operation 1610. The plurality of segments of the second color component block of the current block are individually predicted based on the pixel values of the second color component of regions that are adjacent to the respective segments and are encoded prior to the current block. The plurality of segments may be predicted by using different context pixel values. A method of individually predicting a plurality of segments has been described with reference to FIGS. 14A and 14B.

In operation 1630, the image encoding apparatus encodes the second color component block of the current block based on the prediction result of operation 1620. A residual block is generated by subtracting a prediction block of the second color component block, which is generated by individually predicting a plurality of segments, from the second color component block of the current block, frequency domain coefficients are generated by transforming the generated residual block into a frequency domain, and a bitstream is generated by quantizing and entropy-encoding the generated frequency domain coefficients.

Figure 17:
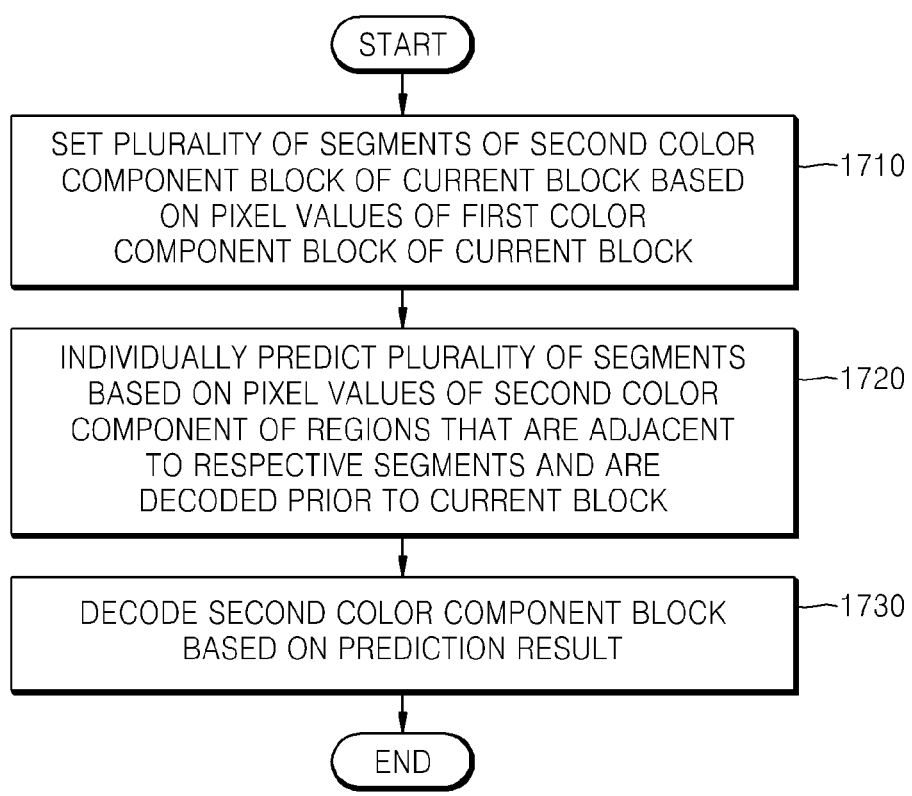
FIG. 17 is a flowchart of a method of decoding an image, according to an exemplary embodiment.

FIG. 17 is a flowchart of a method of decoding an image, according to an exemplary embodiment.

Referring to FIG. 17, in operation 1710, an image decoding apparatus according to an exemplary embodiment sets a plurality of segments of a second color component block of a current block based on pixel values of a first color component block of the current block.

The plurality of segments of the first color component block is set based on the pixel values of the first color component block that is decoded prior to the second color component block of the current block, and the plurality of segments of the second color component block is set on the plurality of segments of the first color component block. The plurality of segments may be set using the same method as in a method of encoding an image. A method of setting a plurality of segments has been described with reference to FIGS. 10A, 10B, 11, 12, and 13.

In operation 1720, the image decoding apparatus individually predicts the plurality of segments set in operation 1710. The plurality of segments of the second color component block of the current block are individually predicted based on pixel values of the second color component of regions that are adjacent to the respective segments and are encoded prior to the current block. The prediction method is the same as the method of encoding an image described with reference to FIGS. 14A and 14B.

In operation 1730, the image decoding apparatus decodes the second color component block of the current block based on a prediction result of operation 1720. Frequency domain coefficients are generated by entropy-decoding a bitstream of the second color component block of the current block, and pixel values of a pixel domain are restored by inverse-quantizing the frequency domain coefficients and performing inverse-transform based on the frequency domain coefficients. The second color component block of the current block is restored by adding a residual block of the second color component block, which is generated as a restoration result, and a prediction block generated as the prediction result of operation 1720.

According to one or more exemplary embodiments, accurate prediction may be performed by predicting a current block based on a similarity between color components, thereby increasing an compression ratio when an image is encoded.

While the present invention has been particularly shown and described with reference to exemplary embodiments thereof, it will be understood by one of ordinary skill in the art that various changes in form and details may be made therein without departing from the spirit and scope of the invention as defined by the following claims and their equivalents. Also, the encoding and decoding methods and apparatuses may be embodied as computer readable codes on a computer readable recording medium.

The image encoding or decoding apparatus or the image encoder or decoder illustrated in FIG. 1, 2, 4, 5, 9, or 15 may include a bus coupled to every unit of the apparatus or coder, at least one processor that is connected to the bus and is for executing commands, and memory connected to the bus to store the commands, received messages, and generated messages.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

What is claimed is:

1. A method of decoding an image, the method comprising:
segmenting a second color component block of a current block into a plurality of segments based on pixel values of a first color component block of the current block;
predicting a first segment among the plurality of segments based on a first pixel value of a second color component pixel that is adjacent to the first segment and included in a region decoded prior to the current block and predicting a second segment among the plurality of segments based on a second pixel value of a second color component pixel that is adjacent to the second segment and included in the region decoded prior to the current block; and
decoding the second color component block based on the predicted first segment and the predicted second segment,
wherein the current block is one of a coding unit among hierarchical coding units split from a maximum coding unit and a prediction unit split from the coding unit, and the maximum coding unit is one of maximum coding units generated by dividing an image.

2. The method of claim 1, wherein the segmenting comprises:
setting a predetermined reference value based on pixel values of the first color component block; and
setting the plurality of segments of the second color component block based on a first portion and a second portion,
wherein, from among pixels of the first color component block, a pixel having a pixel value that is equal to or smaller than the reference value is set as the first portion, and a pixel having a pixel value that is greater than the reference value is set as the second portion.

3. The method of claim 1, wherein the predicting the first segment and the second segment comprises predicting the first segment and the second segment based on a mean of a plurality of pixel values of the second color component included in regions that are decoded prior to the current block and adjacent to the first segment and the second segment of the second color component block of the current block.

* * * * *